United States Patent
Norwood

[19]

[11] Patent Number: 6,053,415
[45] Date of Patent: Apr. 25, 2000

[54] APPARATUS AND METHOD FOR MANUALLY ENCODING A MAGNETIC STRIPE

[76] Inventor: Mark Norwood, 19535 Graystone Rd., White Hall, Md. 21161-9134

[21] Appl. No.: 09/017,199

[22] Filed: Feb. 2, 1998

[51] Int. Cl.$^7$ .................................................. G06K 19/06
[52] U.S. Cl. ........................................ 235/493; 235/449
[58] Field of Search .................................. 235/380, 493, 235/449; 324/219, 235, 236, 239

[56] References Cited

U.S. PATENT DOCUMENTS

| | | | |
|---|---|---|---|
| 3,922,530 | 11/1975 | Zupancic | 235/475 |
| 4,023,010 | 5/1977 | Horst et al. | 235/462.01 |
| 4,259,699 | 3/1981 | Yoshida | 360/2 |
| 4,261,023 | 4/1981 | Hayashi | 235/449 |
| 4,914,279 | 4/1990 | Massey | 235/449 |
| 5,031,223 | 7/1991 | Rosenbaum et al. | 382/1 |
| 5,040,226 | 8/1991 | Elischer et al. | 382/7 |
| 5,157,246 | 10/1992 | Nakanishi . | |
| 5,237,164 | 8/1993 | Takada | 235/487 |
| 5,307,423 | 4/1994 | Gupta et al. . | |
| 5,452,143 | 9/1995 | Kamagami . | |
| 5,461,239 | 10/1995 | Atherton . | |

*Primary Examiner*—Thien M. Le
*Attorney, Agent, or Firm*—Terrance L. Siemens

[57] ABSTRACT

A hand-held, light-weight wand for magnetically encodes digital information onto a magnetic stripe or track. Preprinted timing marks adjacent the magnetic strip, detected by an optical sensor contained in the wand, are used to generate timing signals which control the encoding of the data onto the magnetic stripe. Six rotary thumb-wheel switches are used to dial in a six digit decimal number to be encoded. A write push button switch in the wand body is depressed as the wand is passed along the magnetic stripe. A second pass of the wand along the magnetic stripe reads back the previously encoded signal which is compared the number still dialed into the thumb-wheel switches. If the comparison is favorable, a "successful read" LED also located in the body of the wand is illuminated to signal the operator that the desired number has been correctly encoded. A desktop version of the manual magnetic encoder and an alternate version of the encoding wand using a small numeric keypad for data entry are also shown.

24 Claims, 5 Drawing Sheets

APPARATUS AND METHOD FOR MANUALLY ENCODING A MAGNETIC STRIPE

FIELD OF THE INVENTION

The present invention relates to an apparatus and method for encoding a digital signal onto a magnetic medium, and more specifically to a hand-held wand for encoding a signal on a magnetic stripe and to a method for using the hand-held wand which insures that the encoded signal will be readable by compatible magnetic reading equipment.

BACKGROUND OF THE INVENTION

The use of magnetic media, specifically "mag stripe" media is well known. Magnetic stripes are found on the back of almost all bank credit, debit or access cards for use in accessing ATMs or transacting sales at a merchant. Similar stripes are well known on employee badges for controlling access to buildings and other facilities. This mag stripe technology is useful for transporting machine-readable information in a variety of other ways. For the aforementioned and similar applications, the information encoded on the mag stripe is generally permanent (e.g., an account number, a personal identification number or the like). The encoding of such information is typically done at a central facility, such as a bank, personnel office, etc. The information will then remain unchanged throughout the life of the item bearing the mag strip. Mag stripe reading technology is both inexpensive and plentiful. The holdback to wider use of this mag stripe technology is the encoding process.

Reading an encoded signal from a mag stripe is relatively easy. An encoded mag stripe is passed by a magnetic read head (i.e., "swiped"). In most applications, the user moves the mag stripe past the read head. This means that the instantaneous speed of the stripe past the read head is subject to significant variation in speed, not only from user to user, but during any single swipe operation as well. The mag stripe reading systems today are highly tolerant of these speed variations. Unless the speed of the stripe past the head is either too slow to induce a readable signal in the read head, or so fast that circuitry can't discern the magnetic pulses, an accurate read is usually accomplished. This happens because the spacing of the bits along the mag stripe is uniform, and timing or synchronizing signals are inherent in the encoded magnetic signal.

Writing (encoding) the magnetic signal onto the stripe is another matter. In order to provide a relatively uniform spacing of magnetic pulses along the stripe or track, the velocity of the mag stripe relative to the magnetic write head must be essentially constant. This is easily achieved in devices where either the write head or the magnetic media are moved by a motor-driven transport mechanism. Such mechanisms are both bulky and relatively expensive. If it were easier and/or cheaper to encode mag stripes, a great number of new applications for the technology would present themselves. However, the equipment to perform the magnetic encoding has heretofore been too expensive and/or bulky to make locally available for these types of application. Several applications are discussed which could benefit from mag stripe technology.

Batch "cards" often accompany lots of parts through a manufacturing site. More often than not, a printed batch number must be visually read and processed by a human at each work station where the batch of parts is to be processed.

Another area where batch-type identification is required is in warehouse operations. Here, individual parts or items are "picked" to make up an order, each order having a unique order number. Much paperwork is required to follow these orders though the warehouse and to see that the orders are properly shipped either to an outside customer or to the correct location internally. In addition, each part or item usually has a part number which must be tracked for inventory control.

In offices, batches of mail, complex documents, or other batch-type jobs are also often identified by a routing slip containing an identification number. Again, printed identification numbers must be assigned and affixed to each job. Human error may subsequently occur in reading these generally hand-written identification numbers.

Each of these types of application could greatly benefit from the available of low-cost, portable mag stripe writing technology.

DISCUSSION OF THE PRIOR ART

U.S. Pat. No. 5,157,246 for SPEED CONTROL FOR MANUAL SCANNING CARD READER/WRITER; issued Oct. 20, 1992 to Tomoyuki Nakanishi teaches a typical apparatus for the manual encoding and reading of information to and from a magnetic card. A speed-governed roller is used to insure that a constant media velocity is maintained as the magnetic card is manually conveyed past the magnetic read/write head. The constant velocity insures uniform spacing of magnetic pulses which facilitates accurate read-back of the encoded information. The magnetic encoder wand system of the instant invention differs significantly from the system taught by Nakanishi. The inventive wand is manually passed over the surface of a magnetic strip. No mechanism such as a governor roller is required to accurately encode information onto the magnetic stripe. The inventive wand can be used to encode mag stripes affixed to large items such as cartons or the like since it may be freely moved into contact with magnetic media on any small flat surface.

Another U.S. Pat. No. 5,307,423 for MACHINE RECOGNITION OF HANDWRITTEN CHARACTER STRINGS SUCH AS POSTAL ZIP CODES OR DOLLAR AMOUNTS OF BANK CHECKS; issued Apr. 26, 1994 to Om P. Gupta teaches the use of pre-printed bar codes in a "reserved" area. These bar codes contain information about the format of the field of hand-printed characters which are to follow. Additional non-machine-readable alignment marks used as templates allow proper drawing of hand-written characters on a prescribed area of the face of a document. In contradistinction, the magnetic encoding apparatus and method of the instant invention use regular, pre-printed timing marks along the length of a magnetic strip. No information is encoded in the timing marks; rather they function to control the encoding of magnetic bits along the magnetic stripe or track. Also, unlike the Gupta system, the instant invention requires no motor-driven mechanism to transport documents past a scanner read station. Gupta does no encoding, magnetic or otherwise, on the document but simply optically reads hand-written characters.

U.S. Pat. No. 5,452,143 for APPARATUS AND METHOD FOR READING BINARY DATA FROM A MAGNETIC STRIPE; issued Sep. 19, 1995 to Shinya Kamagami discloses a typical magnetic stripe data reader having means for avoiding extraneous clock data signals. No provision for actually encoding magnetic signals on a mag stripe is taught. In contradistinction, the apparatus and method of the instant invention are intended specifically to write or encode information magnetically on pre-existing magnetic stripes. The inventive magnetic encoding apparatus relies on optically-sensed timing marks proximate the magnetic stripe. A built in check feature allows for reading the encoded data to insure that it has been properly encoded.

U.S. Pat. No. 5,461,239 for METHOD AND APPARATUS FOR CODING AND READING INFORMATION IN DIFFRACTION GRATINGS USING THE DIVERGENCE OF DIFFRACTED LIGHT BEAMS; issued Oct. 24, 1995 to Peter S. Atherton teaches the encoding of information in diffraction gratings using a bar code or a pixelgram strategy. Upon illumination, each facet of the diffraction grating produces a light beam which may be machine read by a plurality of detectors. By altering the surface of the diffraction grating, information may be recorded or erased. On the other hand, the magnetic encoding wand system of the present invention does not rely on the modification of the surface of a diffraction grating to encode information. Neither does the inventive wand require a plurality of sensors to read the encoded information from the surface. While Atherton discloses the possible use of a bar coded diffraction grating parallel to a magnetic stripe for an application such as a highly secure credit card, the bar code comprises optical diffraction gratings, not pre-printed timing marks. The purpose of the diffraction gratings is to actually contain optically-encoded data, not to provide a timing system for encoding information onto the magnetic stripe.

It is therefor an object of the invention to provide a hand-held magnetic encoding wand for encoding digital information onto a magnetic stripe.

It is a further object of the invention to provide a magnetic encoding wand having a built-in optical sensing system for reading pre-printed timing marks adjacent to and along the length of the magnetic stripe.

It is yet another object of the invention to provide a magnetic encoding wand having a read-back feature to insure that the correct pattern has been encoded onto a magnetic stripe.

It is yet a further object of the invention to provide a magnetic encoding wand having self-contained data input means for generating the information to be encoded onto the magnetic stripe.

It is a still further object of the invention to also provide a desktop or surface-mounted version of the magnetic encoder having the previously-described features and/or functions.

SUMMARY OF THE INVENTION

The present invention features a hand-held, light-weight wand for magnetically encoding digital information onto a magnetic stripe or track. Pre-printed timing marks adjacent to and along the length of the magnetic stripe are detected by an optical sensor contained in the wand and are used to generate timing signals for controlling the encoding of the data onto the magnetic stripe. Six self-contained rotary thumb-wheel type switches are used to "dial in" a six digit decimal number to be encoded. A write push button switch in the wand body is depressed as the wand is passed along and in contact with the magnetic stripe. A second pass of the wand along the magnetic stripe without the write push button depressed, reads back the previously encoded signal. If the data read back matches the number still dialed into the thumb-wheel switches, a "successful read" LED, also in the body of the wand, is illuminated to signal the operator that the desired number has been correctly encoded.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

Generally speaking this invention relates to the manual encoding of digital information onto magnetic media, and more particularly to a hand-held, light-weight wand for magnetically encoding digital information onto a magnetic stripe or track.

Figure 1:
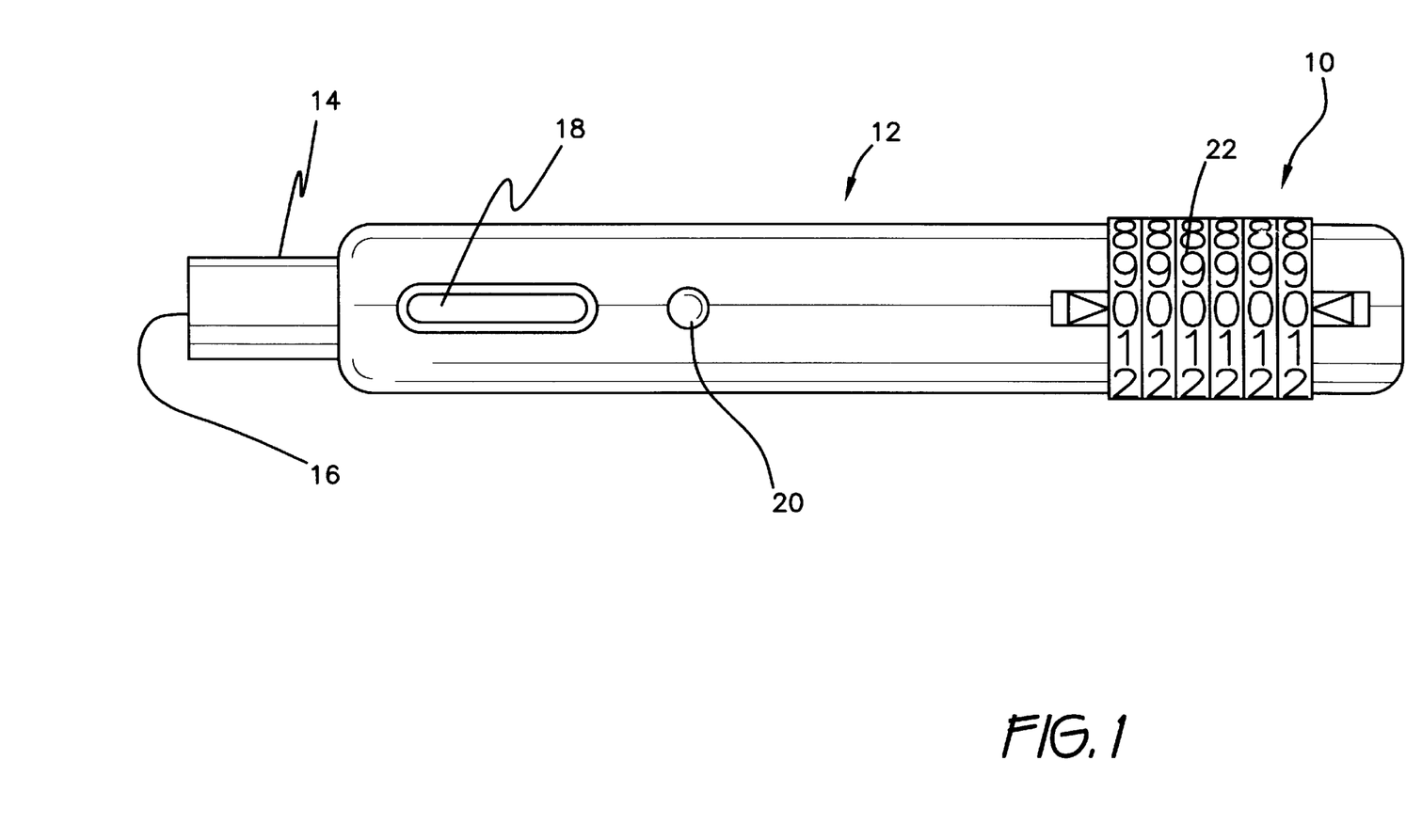
FIG. 1 is a schematic view of the encoding wand of the invention.

Referring first to FIG. 1, there is shown generally at reference number 10, a simplified schematic representation of a magnetic encoding wand or stylus. A cylindrical housing 12 is used to support and contain a magnetic read/write head 14 at a first distal end of housing 12. An optical sensor 16 is located proximate magnetic read/write head 14. Optical sensor 16 is a self-contained, reflective unit with a focused light source (not shown) on one side of sensor 16 and a photo transistor or similar light-sensitive transducer (not shown) on the second side. One or more lenses (not shown) may also be contained in sensor assembly 16. A commercially available sensor assembly such as catalog number HEDS-1500 manufactured by Hewlett Packard has been found suitable for this application. Other strategies for "reading" the pre-printed timing marks could be implemented. For example, if the timing marks were printed with the same magnetic ink used for the magnetic stripe, an additional magnetic read head could be employed to read the timing marks magnetically. Another possibility would be using a conductive ink for the printing of the timing marks which could then be sensed by passing a current through a pair of contacts brushing over the timing marks. Disposed along housing 12 are a write push button switch 18 and a "Successful Read" indicator 20. It should be obvious that the shape and size of housing 12 may be varied to meet a particular operating requirement and also that the placement of write switch 18 and/or indicator 20 may be varied without deviating from the true scope and spirit of the invention. Push button switch 18 may be any of a variety of suitable switches well known to those in the circuit design art. In the preferred embodiment. Indicator 20 is an LED although other visual or audible indicators could be employed. A plurality of thumb-wheel switches 22 are located adjacent the second distal end of housing 12. A bank of six switches 22 has been chosen for purposes of disclosure but any reasonable number of switches 22 could be employed depending on particular operating requirements. In the preferred embodiment, each switch 22 generates a single digit of a decimal number to be encoded onto a magnetic stripe (not shown) but other strategies or other switch type could also be employed. Switches 22 such as catalog number T20-01A manufactured by Cherry Electrical Products have been found suitable, although some modifications are necessary to adapt the switches to the wand structure. In alternate embodiments, an external data source could be connected to encoding wand 10 via wire, IR link or other communications means well know to those of skill in the art. In other alternate embodiments, an optical reader could be utilized to supply the data. Housing 12 also contains a battery (not shown) which provides power to the circuitry of encoding wand 10. In the preferred embodiment, a 3.6 volt lithium battery has been chosen although other power sources including either rechargeable or disposable batteries could also be employed.

Figure 2:
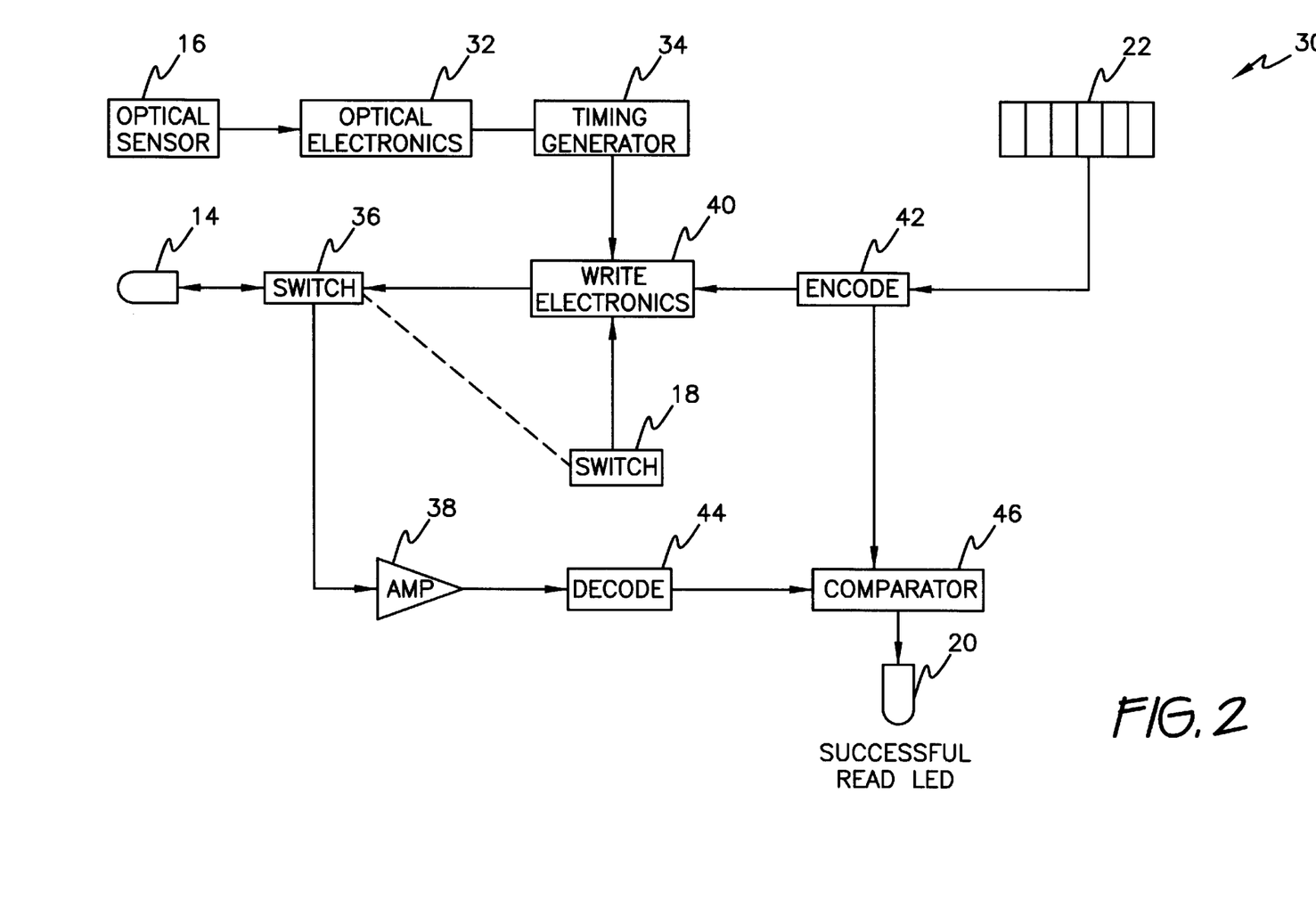
FIG. 2 is a functional block diagram of the encoding wand of FIG. 1.

Referring now to FIG. 2, there is shown a functional block diagram of the encoding wand of FIG. 1, shown generally at reference number 30. Optical sensor 16 is connected to optical amplifier and signal conditioning electronics 32. The output of optical electronics 32 is connected to timing generator 34. The output of magnetic read/write head 14 is connected to a switch 36. Switch 36 functionally connects head 14 to either the input of sense amplifier 38 or the output of write electronics 40 depending upon the whether a read or write function is currently being performed. Switch 36 could either be controlled by push button switch 18 or could physically be part of push button switch 18. Switches 22 are connected to the input of an encoder circuit 42. The output of encoder 42 is connected to one input of write electronics 40. The output of timing generator 34 is connected to a second input to write electronics 40. Write push button 18 is connected to a third input to write electronics 40. The output of sense amplifier 38 is connected to an input of decoder circuit 44. The output of decoder 44 is connected to the first input of comparator 46. The second input of comparator 46 is connected to the output of encoder 42. The "Successful Read" indicator 20 is connected to the output of comparator 46. It should be obvious to those of skill in the circuit design art that all the digital functions could readily be performed by a simple microprocessor (not shown) running microcode stored in PROMS PALs or similar suitable non-volatile storage devices (not shown).

Figure 3:
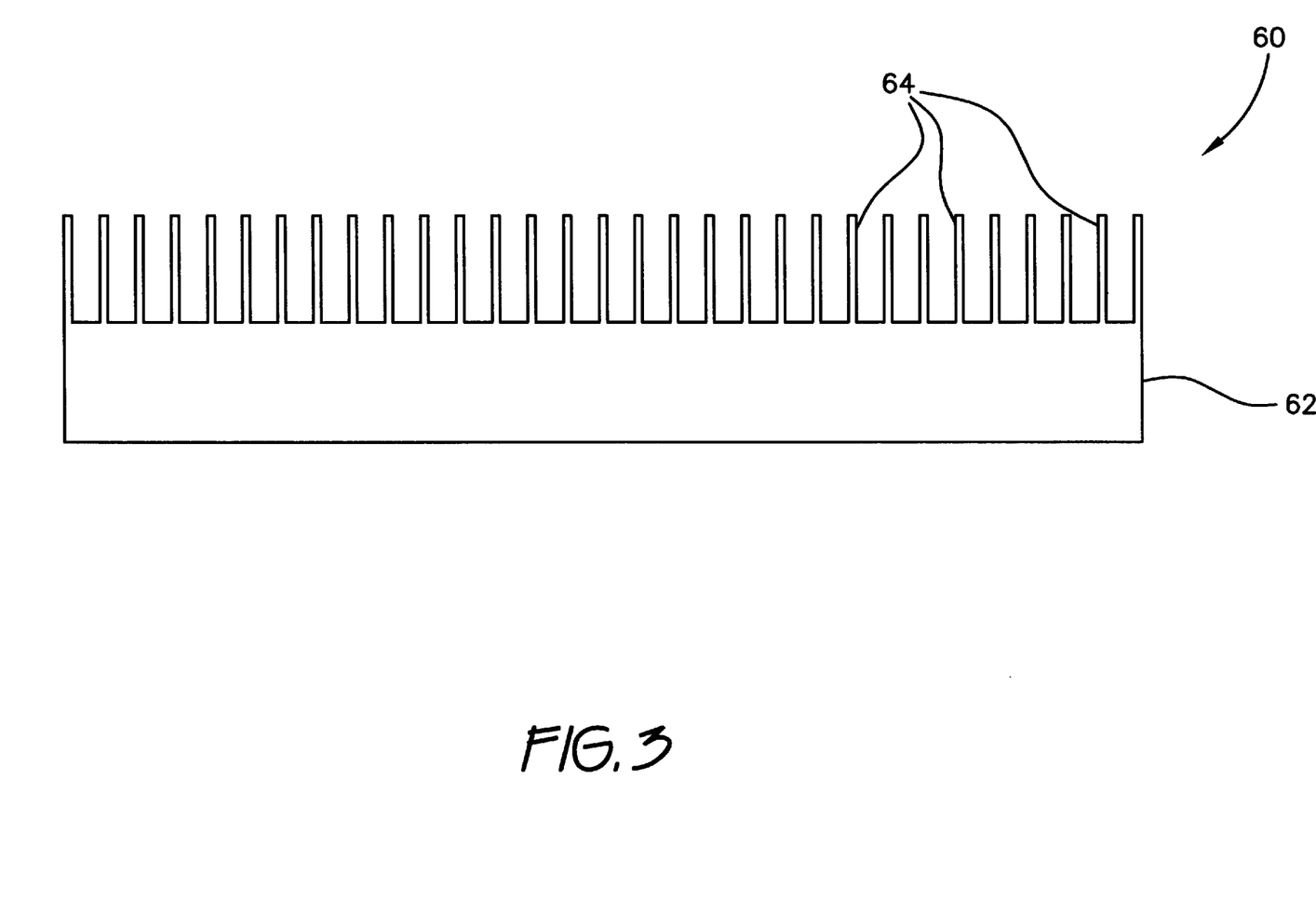
FIG. 3 is a schematic diagram of a typical magnetic stripe with timing marks printed adjacent thereto.

Referring now also to FIG. 3, there is shown a schematic representation of a typical magnetic stripe or track, reference number 60. Mag stripe 62 is shown as an elongated region which is formed of a readily magnetizable material as is well known to those of skill in the art. A plurality of pre-printed timing marks 64 are located adjacent to and along the length of magnetic stripe 62. Timing marks 64 may be printed using the same magnetic ink used to form track 62 although timing marks generally need not have any special magnetic properties. Alternately, timing marks 64 may be printed using any ink having a color discernable by the optical sensor assembly 16 (FIGS. 1 and 2). Track 62 and timing marks 64 may be deposited on any suitable surface such as an envelope, card, package surface, or the like.

Figure 4:
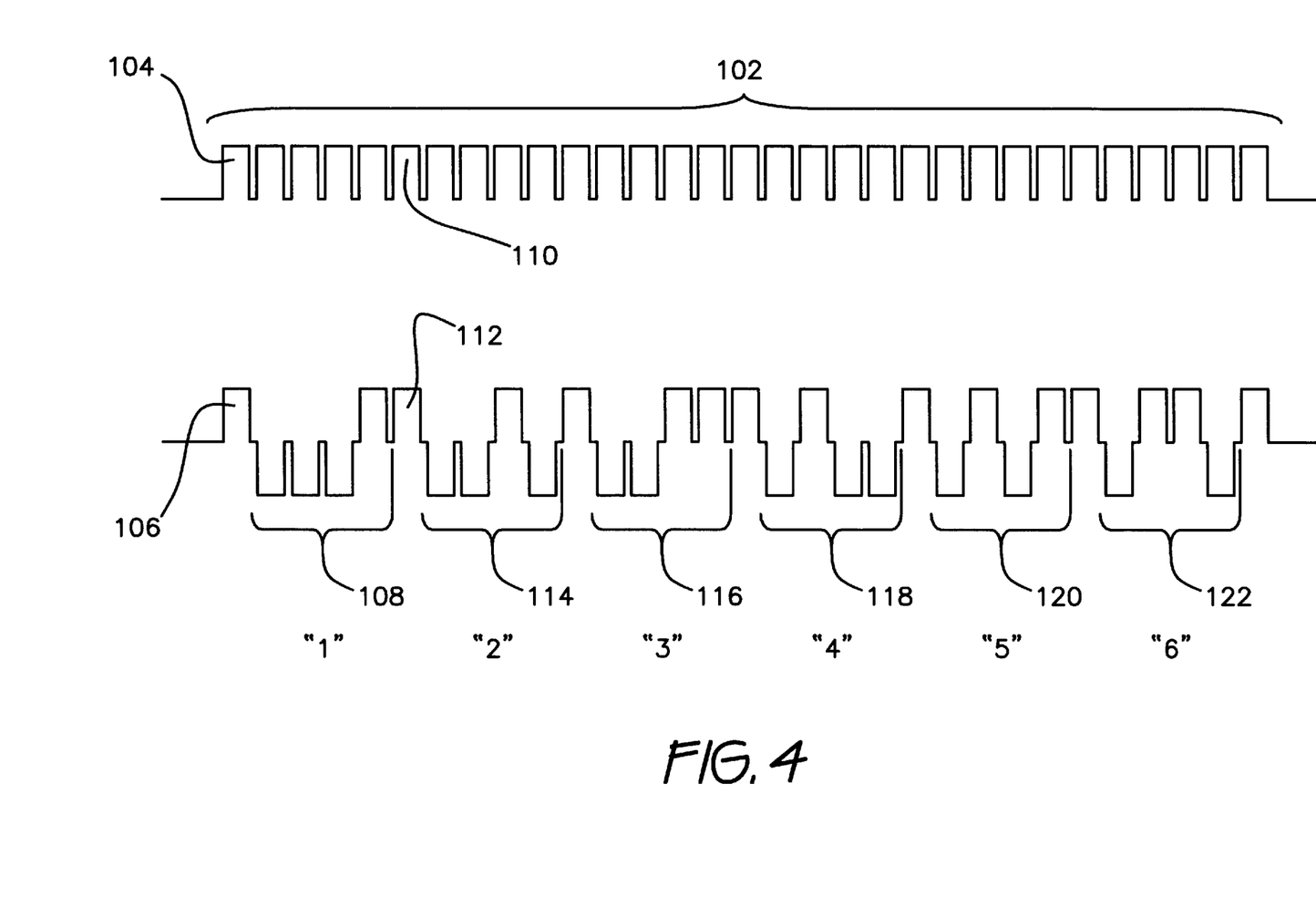
FIG. 4 is a timing diagram of a 4-bit binary data-encoding scheme.

In operation, magnetic encoding wand 10 is moved along mag stripe 62 (FIG. 3). As optical sensor 16 passes each pre-printed timing mark 64 (FIG. 3) disposed along mag stripe 62, a timing pulse 102 is generated. As the swipe of mag stripe 62 begins, the first (left-most) timing pulse 104 indicates the start of a magnetic encoding operation. The first character to be magnetically encoded on mag stripe 62 has previously been selected by setting the left-most switch 22 to the desired digit 0–9. It should be obvious that with the use of a four-bit encoding scheme, the full hexadecimal character set 0–F could be encoded. In the embodiment chosen for purposes of disclosure, a simple 4-bit binary code is used for encoding the character. Such a 4-bit code allows for the encoding of digits 0–9. Obviously, other coding schemes could be employed including a 7 or 8-bit code which would allow encoding the full ASCII character set, or a 3-bit code (octal) would permit the encoding of characters 0–7. Assuming that write push button switch 18 is depressed as the swipe commences, a magnetic pulse 106 (a "start bit") is written in synchronism with first timing pulse 104. Assuming that the first character chosen for encoding is the digit "1", the binary code representation would be 0001. An upward magnetic pulse represents a binary one while a downward magnetic pulse represents a binary zero. Following magnetic pulse 106, four additional magnetic pulses 108, each synchronized with a corresponding timing pulse 102, are written. Magnetic pulses 108 represent the "0001" binary code necessary to represent the decimal digit "1". At the next timing pulse 110, another start bit 112 is written and the encoding of a second character consisting of magnetic pulses 114 begins. The second character illustrated is a decimal "2" (binary "0010"). Four additional characters are encoded, decimal characters 3, 4, 5, and 6 (bits 116, 118, 120, and 122), respectively. It will be obvious to those of skill in the art that any number of different encoding schemes such as gray code as are well known could be used in place of a simple binary encoding scheme. Also, check strategies such as parity bits, and/or a CRC system could also be implemented if operating requirements warranted the added complexity. Because the writing of each magnetic pulse is "clocked" by the generation of a timing pulse 102, the speed with which the mag stripe is "swiped" by the operator is not critical. Overall speed which may vary from person to person, or speed variation during a single swipe are generally compensated for by the inventive self-timing strategy. A second pass of the wand along the magnetic stripe (without push button 18 depressed) reads back the previously encoded signal. If the read data matches the data still dialed into the thumb-wheel switches 22, a successful read LED 20 also in the body of the wand, is illuminated to signal the operator that the desired number has been correctly encoded.

It is possible to equip the reading tip of wand 10 with a cover assembly (not shown) if required to prevent excessive wear on the wand in some environments. Such a cover could be designed to mechanically protect the tip. It is also possible to arrange a flip back cover which would simply move out of the way as wand 10 was moved along the mag stripe 62.

Figure 5A:
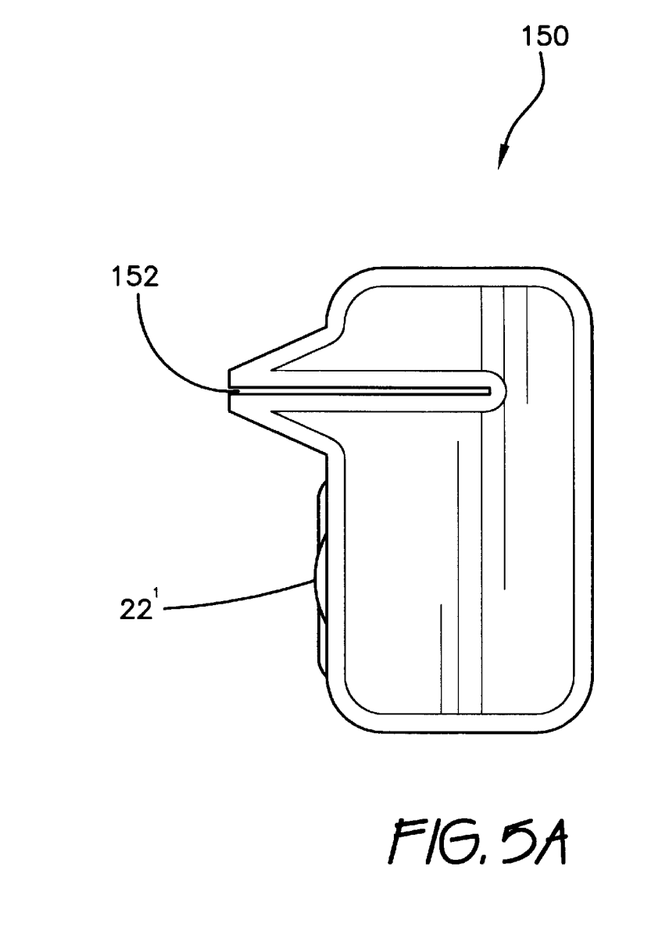
FIG. 5a is a side schematic view of a desktop or surface-mounted version of the manual magnetic encoder.
Figure 5B:
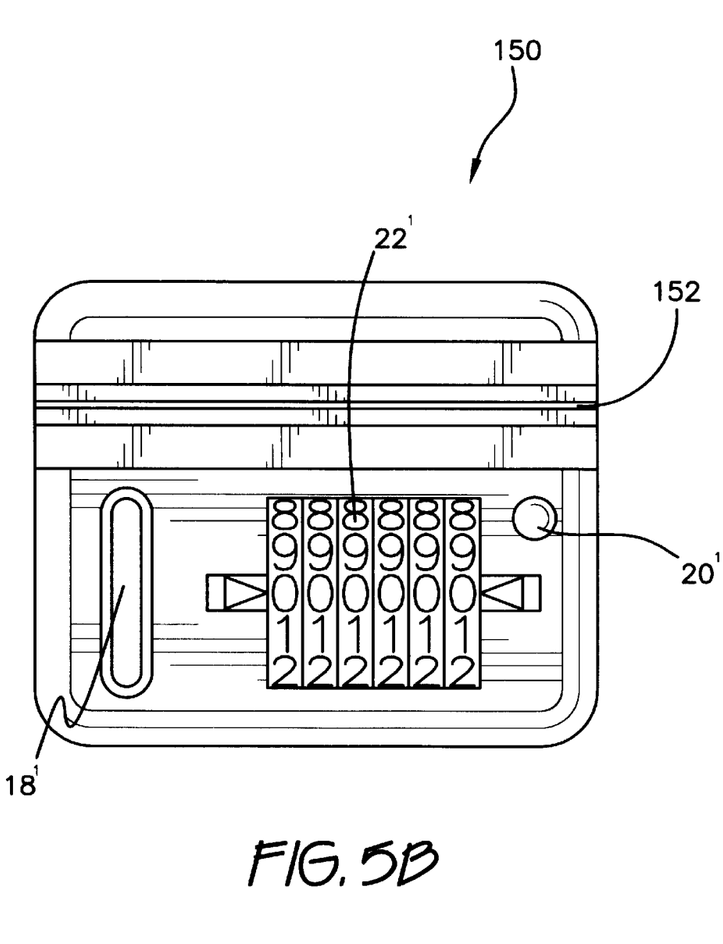
FIG. 5b is a front schematic view of a desktop or surface-mounted version of the manual magnetic encoder.

Referring now to FIGS. 5a and 5b, there is shown, generally at reference number 150, schematic representations of an alternate, desktop or surface-mounted embodiment of the inventive magnetic encoding system. A slot 152 is provided to accept a thin carrier (not shown) having a mag stripe printed thereon. An operator pulls the carrier through slot 152 past a optical sensor (not shown) and a magnetic read/write head (not shown) which function identically to those already described hereinabove. The same operating controls previously described, write push button switch 18', successful read indicator 20' and thumb-wheel switches 22' as disposed upon the housing. It will be obvious to those having industrial design and human factors design skills that a wide variety of case structure and control placements will be possible in practicing the method of the present invention.

Referring now to FIG. 6, there is shown a diagram of an alternate embodiment of the magnetic encoding wand of the invention, reference number 200. Most features of the alternate embodiment of the wand are identical to that originally described hereinabove. A housing 12 is used to support and contain a magnetic read/write head 14 at a first distal end of housing 12. An optical sensor 16 is located proximate magnetic read/write head 14. Optical sensor 16 is a self-contained, reflective unit with a focused light source (not shown) on one side of sensor 16 and a photo transistor or similar light-sensitive transducer (not shown) on the second side. One or more lenses (not shown) may also be contained in sensor assembly 16. A commercially available sensor assembly such as catalog number HEDS-1500 manufactured by Hewlett Packard has been found suitable for this application. Disposed along housing 12 are a write push button switch 18 and a "Successful Read" indicator 20. Push button switch 18 may be any of a variety of suitable switches well known to those in the circuit design art. In the preferred embodiment. Indicator 20 is an LED although other visual or audible indicators could be employed. A small numeric keypad 202 replaces thumbwheel switches 22 (FIG. 1) as the data input device. A small LED display 204 is located proximate numeric keypad 202. In this embodiment, keypad 202 is used to enter the required digits to be encoded. As each digit is entered on keypad 202, it is displayed in sequence on LED display 204. Housing 12 also contains a battery (not shown) which provides power to the circuitry of encoding wand 200. As in the preferred embodiment, a 3.6 volt lithium battery has been chosen although other power sources including either rechargeable or disposable batteries could also be employed.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A magnetic encoding apparatus for manually encoding digital information onto an elongated magnetic stripe, comprising:

an elongated housing, sensing means located proximate a first distal end of said housing for sensing pre-generated timing marks;

magnetic read/write means located proximate said sensing means proximate said first distal end;

first switch means on said housing for enabling a magnetic encoding operation, said first switch means operable from outside said housing;

second switch means for selecting at least one digit to be magnetically encoded onto said magnetic stripe, said second switch means located on said housing and operable from outside said housing; and circuit means located inside said housing and operatively connected to said sense means, said magnetic read/write means, said first switch means and said second switch means whereby said magnetic encoding wand writes a magnetic code representative of said at least one digit as said magnetic encoding wand is passed essentially in contact with and along said elongated magnetic stripe and said sensing means senses said pre-generated timing marks.

2. The magnetic encoding apparatus as recited in claim 1, said magnetic encoding apparatus further comprising a read mode whereby a previously encoded magnetic signal on said magnetic stripe may be compared to the setting of said second switch means to verify that said magnetically encoded signal is representative of said selected at least one digit.

3. The magnetic encoding apparatus as recited in claim 2, further comprising an indicator, said indicator being visible outside said housing, said indicator being operably connected to said circuit means whereby said indicator is illuminated when the execution of said read mode confirms that said magnetically encoded signal is representative of said selected at least one digit.

4. The magnetic encoding apparatus as recited in claim 3, wherein said indicating means comprises an LED secured in said housing.

5. The magnetic encoding apparatus as recited in claim 1, wherein said sensing means comprises an optical sensing means.

6. The magnetic encoding apparatus as recited in claim 1, wherein said sensing means comprises a magnetic sensing means.

7. The magnetic encoding apparatus as recited in claim 1, wherein said sensing means comprises a conductive sensing means.

8. The magnetic encoding apparatus as recited in claim 1, wherein said first switch means comprises a push-button switch.

9. The magnetic encoding apparatus as recited in claim 1, wherein said second switch means for selecting at least one digit comprises at least one rotary thumb-wheel switch.

10. The magnetic encoding apparatus as recited in claim 9, wherein said at least one rotary thumb-wheel switch comprises six rotary thumb-wheel switches.

11. The magnetic encoding apparatus as recited in claim 1, wherein said second switch means for selecting at least one digit comprises a numeric keypad.

12. The magnetic encoding apparatus as recited in claim 11, wherein said numeric keypad further comprises a numeric display.

13. The magnetic encoding apparatus as recited in claim 12, wherein said numeric display comprises an LED display.

14. The magnetic encoding apparatus as recited in claim 1, wherein said magnetic read/write means comprises a magnetic head adapted for both reading and writing a magnetic signal.

15. The magnetic encoding apparatus as recited in claim 1, further comprising a power source located inside said housing.

16. The magnetic encoding apparatus as recited in claim 15, wherein said power source is a lithium battery.

17. The magnetic encoding apparatus as recited in claim 1, wherein said circuit means comprises a microprocessor.

18. The magnetic encoding apparatus for manually encoding digital information onto an elongated magnetic stripe as recited in claim 1, further comprising guide means proximate said first distal end of said housing to help insure that said magnetic encoding wand may be easily kept aligned with said elongated magnetic stripe and said pre-printed timing marks as said wand is passed along said magnetic stripe.

19. A method for manually encoding data onto a magnetic medium, the steps comprising:

a) providing a surface having an elongated magnetic stripe suitable for receiving encoded magnetic data;

b) providing a plurality of timing marks disposed along and adjacent to said elongated magnetic stripe;

c) generating at least one character of data to be magnetically encoded on said magnetic stripe;

d) transforming said at least one character of data into a code representative of said at least one character of data, said code comprising at least three bits;

e) reading a first timing mark with a sensor;

f) magnetically writing onto said magnetic stripe a start bit responsive to reading said first timing mark;

g) reading a next adjacent timing mark of said plurality of timing marks;

h) magnetically writing onto said magnetic stripe a predetermined bit of said at least three bits of said code in synchronism with the reading of said next adjacent timing mark;

i) repeating steps (g) and (h) until all of said at least three bits comprising said code have been magnetically written onto said magnetic stripe; and j) repeating steps (c) through (j) until all data has been magnetically encoded onto said magnetic stripe.

20. The method for manually encoding data onto a magnetic medium as recited in claim 19, the steps further comprising: adding at least one additional bit to said code representative of said at least one character of data, said additional bit being a parity bit.

21. The method for manually encoding data onto a magnetic medium as recited in claim 19, wherein said code representative of said at least one character of data is a simple binary code.

22. The method for manually encoding data onto a magnetic medium as recited in claim 21, wherein said binary code representative of said at least one character of data is a reflected binary (Gray) binary code.

23. A magnetic encoding apparatus for manually encoding digital information onto an elongated magnetic stripe, comprising:

a housing adapted for deployment on a surface, said housing having a slot adapted to receive a carrier bearing a magnetic stripe;

sensing means located inside said housing proximate said slot for sensing pre-generated timing marks on said carrier bearing a magnetic stripe;

magnetic read/write head located proximate said sensing means proximate said slot;

first switch means on said housing for enabling a magnetic encoding operation, said first switch means operable from outside said housing;

second switch means for selecting at least one digit to be magnetically encoded onto said magnetic stripe, said second switch means located on said housing and operable from outside said housing; and circuit means located inside said housing and operatively connected to said sense means, said magnetic read/write means, said first switch means and said second switch means;

whereby said magnetic encoding apparatus writes a magnetic code representative of said at least one digit as said carrier bearing a magnetic stripe is manually moved through said slot past said sense means and said magnetic read/write head and said sensing means senses said pre-generated timing marks.

24. The magnetic encoding apparatus as recited in claim 23, said magnetic encoding apparatus further comprising a read mode whereby a previously encoded magnetic signal on said magnetic stripe may be compared to the setting of said second switch means to verify that said magnetically encoded signal is representative of said selected at least one digit.

* * * * *